US 6,539,468 B1

(12) United States Patent
Inoue et al.

(10) Patent No.: US 6,539,468 B1
(45) Date of Patent: Mar. 25, 2003

(54) DATA COPYING SYSTEM, DATA COPYING METHOD, DATA READING APPARATUS, DATA WRITING APPARATUS AND DATA RECORDING MEDIUM

(75) Inventors: Mitsuhiro Inoue, Osaka (JP); Shunji Harada, Osaka (JP); Masayuki Kozuka, Osaka (JP); Makoto Tatebayashi, Hyogo (JP); Yoshihisa Fukushima, Osaka (JP); Mitsuhiko Serikawa, Hyogo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/472,479

(22) Filed: Dec. 27, 1999

(30) Foreign Application Priority Data

Dec. 28, 1998 (JP) ............................. 10-374637

(51) Int. Cl.⁷ .......................... G06F 12/14; G06F 12/16
(52) U.S. Cl. ......................... 712/36; 712/37; 380/201; 380/203
(58) Field of Search ...................... 712/227, 226, 712/37, 36; 360/60; 380/203, 201; 369/53.21, 275.3; 705/57

(56) References Cited

U.S. PATENT DOCUMENTS 5,729,516 A * 3/1998 Tozaki et al. ............. 369/53.21
5,896,454 A * 4/1999 Cookson et al. ............. 360/60

FOREIGN PATENT DOCUMENTS

| EP | 0766468 | 4/1997 |
|---|---|---|
| EP | 0822550 | 2/1998 |
| EP | 0860823 | 8/1998 |
| EP | 0903736 | 3/1999 |
| WO | 98/16927 | 4/1998 |

OTHER PUBLICATIONS

Search Report for European Application No. 99125894.8 dated Jun. 6, 2000.

* cited by examiner

Primary Examiner—Daniel H. Pan
(74) Attorney, Agent, or Firm—Renner, Otto, Boisselle & Sklar

(57) ABSTRACT

There is provided a copying system for copying information recorded on a first recording medium onto a second recording medium. The first recording medium is recorded with copying control information for representing conditions for permitting copying of the information recorded on the first recording medium, the copying control information being multiplexed within the information recorded on the first recording medium. The copying system includes: a reading section for reading the information from the first recording medium; a detection section for detecting the copying control information within the information read from the first recording medium; a modification section for, if the copying control information represents a condition that "only copying to a second generation copy is permitted", modifying the copying control information so as to prohibit any further copying; and a writing section for writing information including the modified copying control information, onto the second recording medium.

8 Claims, 6 Drawing Sheets

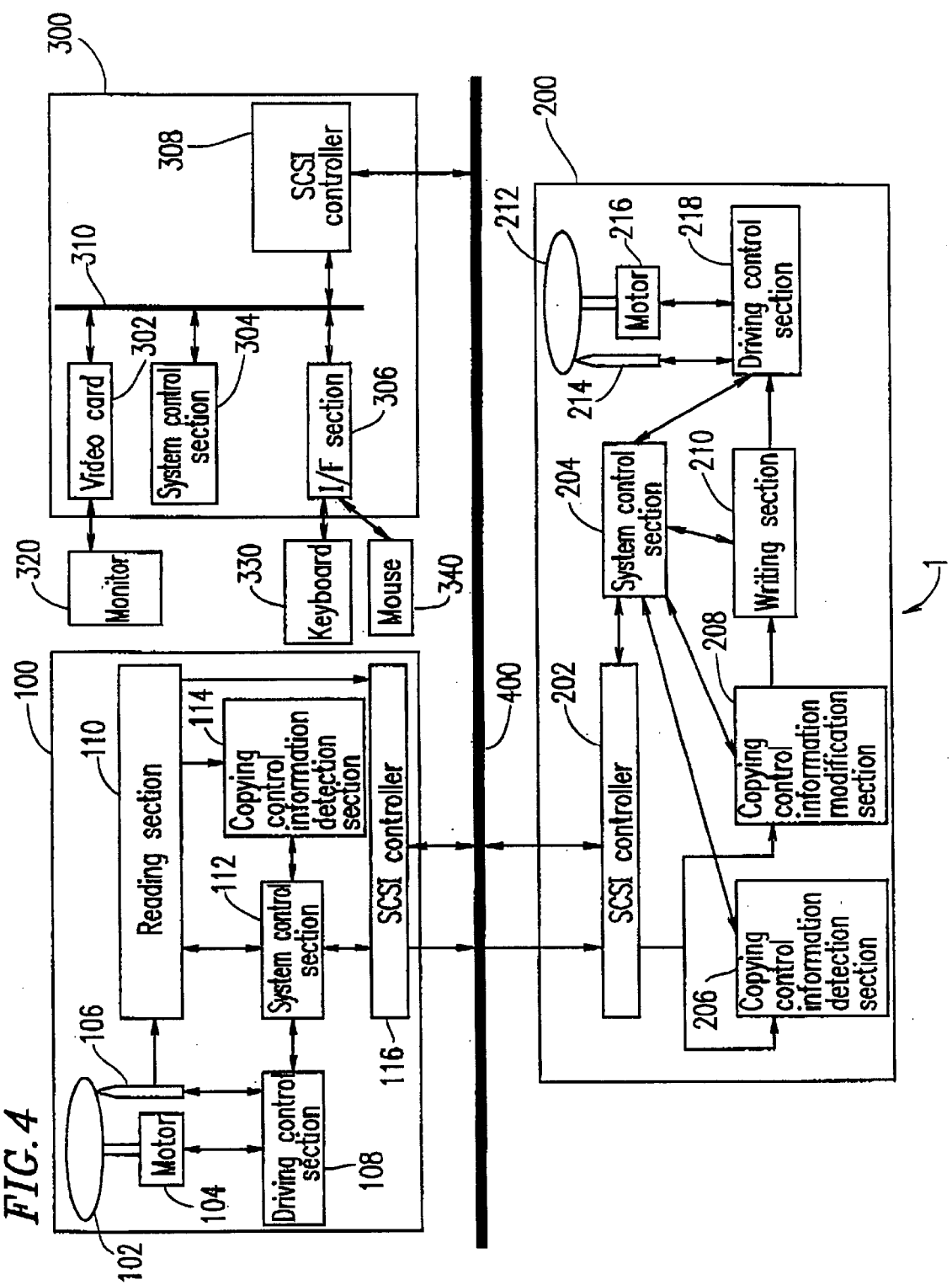

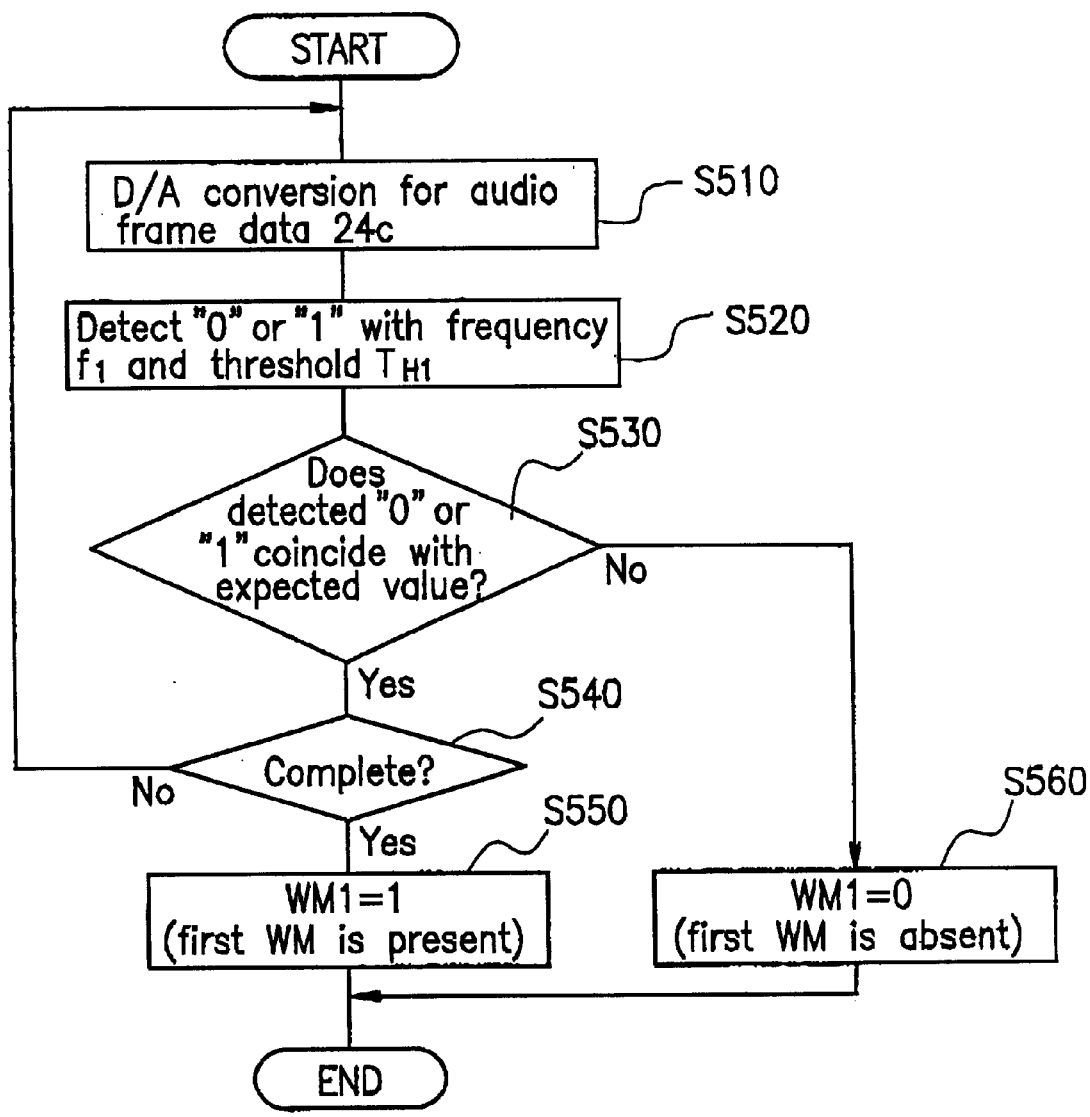

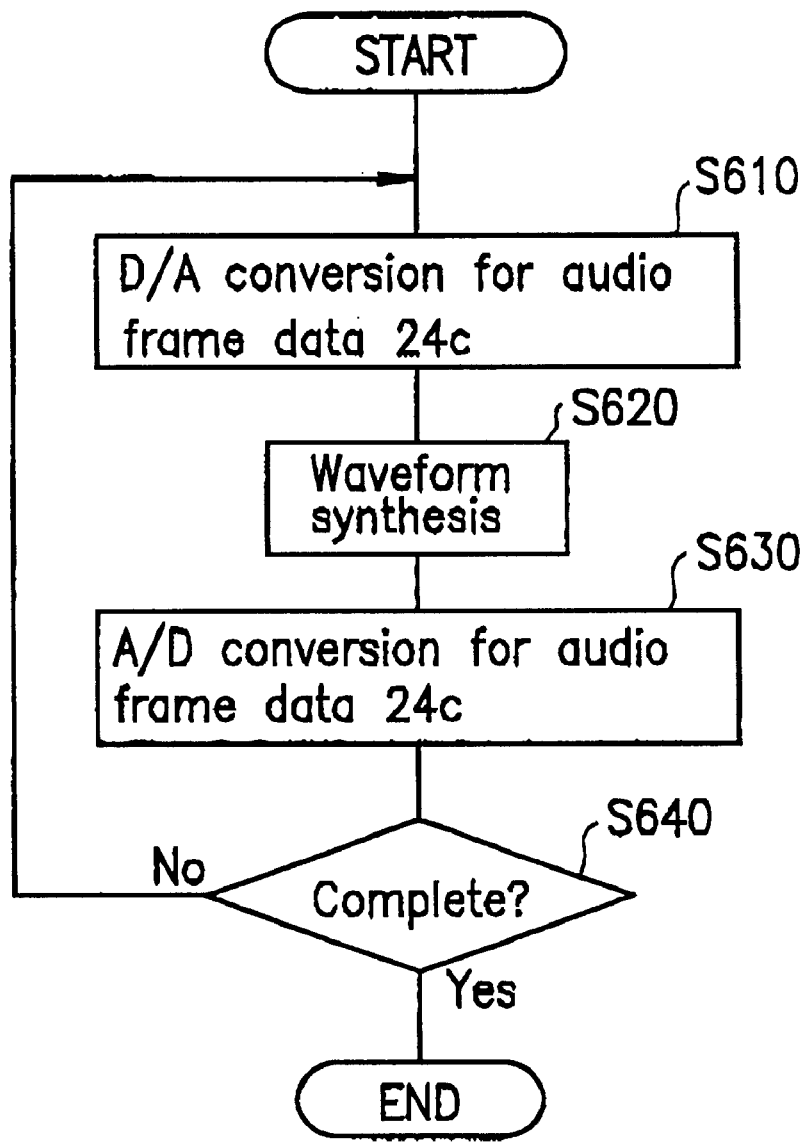

DATA COPYING SYSTEM, DATA COPYING METHOD, DATA READING APPARATUS, DATA WRITING APPARATUS AND DATA RECORDING MEDIUM

BACKGROUND OF THE INVENTION

1. Field of the Invention

The present invention relates to a data copying system and a date copying method for providing a copyright protection function, as well as a reading apparatus, a writing apparatus, and a recording medium for use in such a data copying system.

2. Description of the Related Art

Methods for encrypting information recorded on a recording medium for providing a copyright protection function are known in the art. For example, unauthorized decryption of encrypted information can be made substantially difficult by adopting a hierarchical structure for encryption keys that are used for the encryption of the information. Such techniques are intended for preventing unauthorized copying of information which is recorded on the recording medium.

The standards which are proposed for DVD-Audio, a prospective next-generation audio medium, require that an enhanced copyright protection function be provided. The requirement includes the prohibition of a "third generation digital copy" from a ROM (read only memory) disk.

As used herein, the prohibition of a "third generation digital copy" means that, whilst a ROM disk (i.e., a "first generation copy") may be allowed to be duplicated or copied once onto a RAM disk (random access memory disk) (i:e., "a second generation copy"), any further copying of that RAM disk to another RAM disk (which would result in "a third generation copy") in prohibited.

SUMMARY OF THE INVENTION

According to the present invention, there is provided a copying system for copying information recorded on a first recording medium onto a second recording medium wherein the first recording medium is recorded with copying control information for representing conditions for permitting copying of the information recorded on the first recording medium, the copying control information being multiplexed within the information recorded on the first recording medium, wherein the copying system includes: a reading section for reading the information from the first recording medium; a detection section for detecting the copying control information within the information read from the first recording medium, a modification section for, if the copying control information represents a condition that "only copying to a second generation copy is permitted", modifying the copying control information so as to prohibit any further copying, and a writing section for writing information including the modified copying control information, onto the second recording medium.

In one embodiment of the invention, the copying control information is represented by a combination of two kinds of watermarks.

In another embodiment of the invention, the information recorded on the first recording medium includes a plurality of frames, the copying control information being multiplexed within a predetermined number of frames among the plurality of frames.

In another aspect of the invention, there is provided a copying method for copying information recorded on a first recording medium onto a second recording medium, wherein the first recording medium is recorded with copying control information for representing conditions for permitting copying of the information recorded on the first recording medium, the copying control information being multiplexed within the information recorded on the first recording medium, wherein the copying method includes the steps of: reading the information from the first recording medium; detecting the copying control information within the information read from the first recording medium; if the copying control information represents a condition that "only copying to a second generation copy is permitted", modifying the copying control information so as to prohibit any further copying; and writing information including the modified copying control information, onto the second recording medium.

In another aspect of the invention, there is provided a reading apparatus for reading information recorded on a first recording medium, wherein the first recording medium is recorded with copying control information for representing conditions for permitting copying of the information recorded on the first recording medium, the copying control information being multiplexed within the information recorded on the first recording medium, and wherein the reading apparatus is connected via a bus to a writing apparatus for writing the information onto a second recording medium, the reading apparatus including: a reading section for reading the information from the first recording medium; a detection section for detecting the copying control information within the information read from the first recording medium; and a control section for, if the copying control information represents a condition that "copying Is entirely prohibited", prohibiting the information from being output to the bus.

In another aspect of the invention, there is provided a writing apparatus connected via a bus to a reading apparatus for reading information recorded on a first recording medium, the writing apparatus including: a detection section for receiving the information output from the reading apparatus via the bus and detecting copying control information within the received information read; a modification section for, if the detected copying control information represents a condition that "only copying to a second generation copy is permitted", modifying the copying control information so as to prohibit any further copying; and a writing section for writing information including the modified copying control information, onto a second recording medium.

In another aspect of the invention, there is provided a recording medium recorded with information representing a content to be recorded, and copying control information representing a condition for permitting copying of the information recorded on the recording medium, wherein the copying control information is multiplexed within the information recorded on the recording medium.

In one embodiment of the invention, the copying control information is represented by a combination of two kinds of watermarks.

In another embodiment of the invention, the information recorded on the first recording medium includes a plurality of frames, the copying control information being multiplexed within a predetermined number of frames among the plurality of frames.

In still another embodiment of the invention, the copying control information selectively represents one of at least three conditions: "copying is permitted over an unlimited number of generations"; "only copying to a second generation copy is permitted"; or "copying is entirely prohibited".

Thus, the invention described herein makes possible the advantages of (1) providing a data copying system and a data copying method which permit the copying of a first generation copy (e.g., a ROM disk) into a second generation copy (e.g., a RAM disk) in compliance with the DVD-Audio standards; and (2) providing a reading apparatus, a writing apparatus, and a recording medium for use in such a data copying system.

These and other advantages of the present invention will become apparent to those skilled in the art upon reading and understanding the following detailed description with reference to the accompanying figures.

BRIEF DESCRIPTION OF THE DRAWINGS

FIG. 4 is a block diagram illustrating the structure of a copying system 1 according to an example of the present invention.

FIG. 5 is a flowchart showing a flow of processes of detecting the presence/absence of a first water mark.

FIG. 6 is a flowchart showing a flow of processes of modifying copying control information.

DESCRIPTION OF THE PREFERRED EMBODIMENTS

Hereinafter, the present invention will be described by way of examples, with reference to the accompanying figures.

Figure 1:
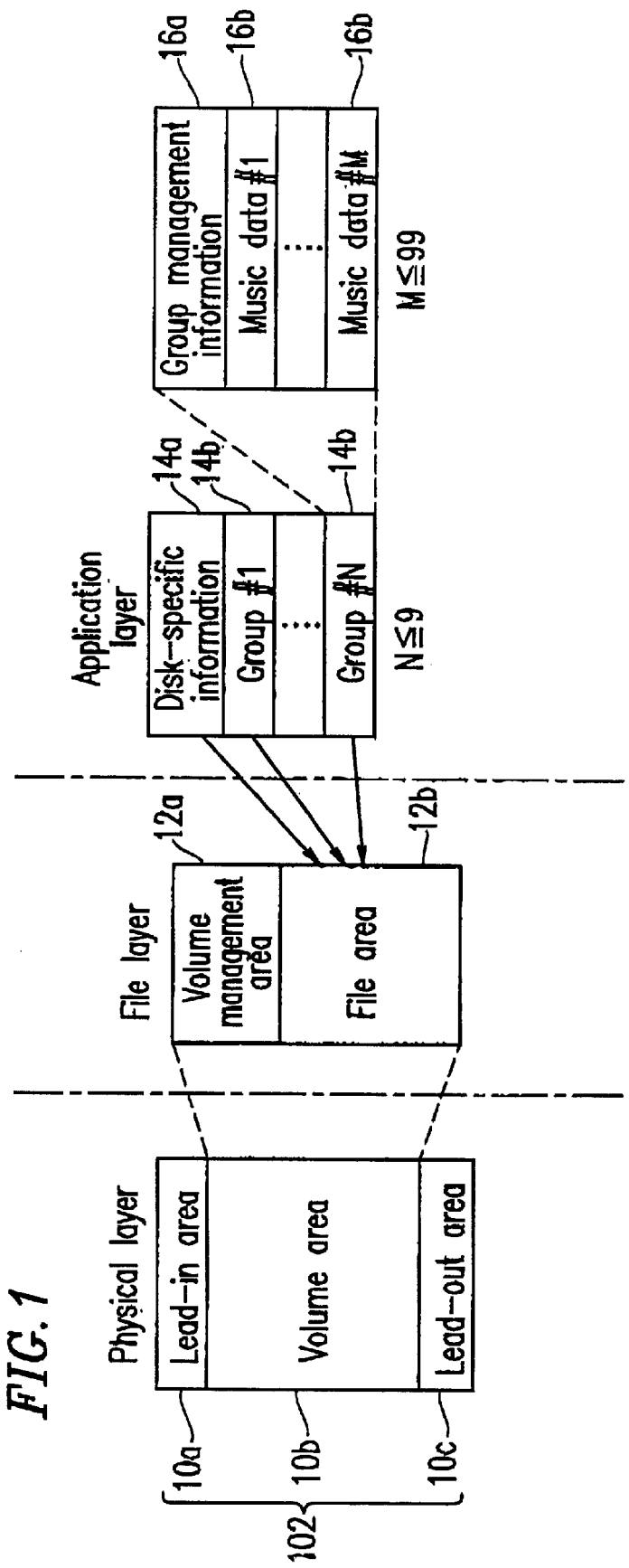
FIG. 1 is a diagram showing a data structure which may be recorded on a ROM disk 102 used in a copying system 1 according to the present invention.

FIG. 1 shows a data structure recorded on a ROM disk 102 for use in a copying system 1 according to the present invention. The copying system 1 will be described later with reference to FIG. 4.

As shown in FIG. 1, the ROM disk 102 includes a lead-in area 10a, a volume area 10b, and a lead-out area 10c. For example, the lead-in area 10a may be disposed so as to adjoin the volume area 10b on an inner periphery side, and the lead-out area 10c may be disposed so as to adjoin the volume area 10b on an outer periphery side, with the volume area 10b being disposed between the lead-in area 10a and the lead-out area 10c.

The volume area 10b is further divided into a volume management area 12a and a file area 12b. In the file area 12b, disk-specific information 14a, and N units of group information 14b (shown as group #1 to group #N in FIG. 1) are recorded, where N may be an integer which is equal to or smaller than 9, for example.

Each one of the N units of group information 14b includes group management information 16a and M units of music data 16b (shown as music data #1 to music data #M in FIG. 1), where M may be an integer which is equal to or smaller than 99, for example.

Figure 2:
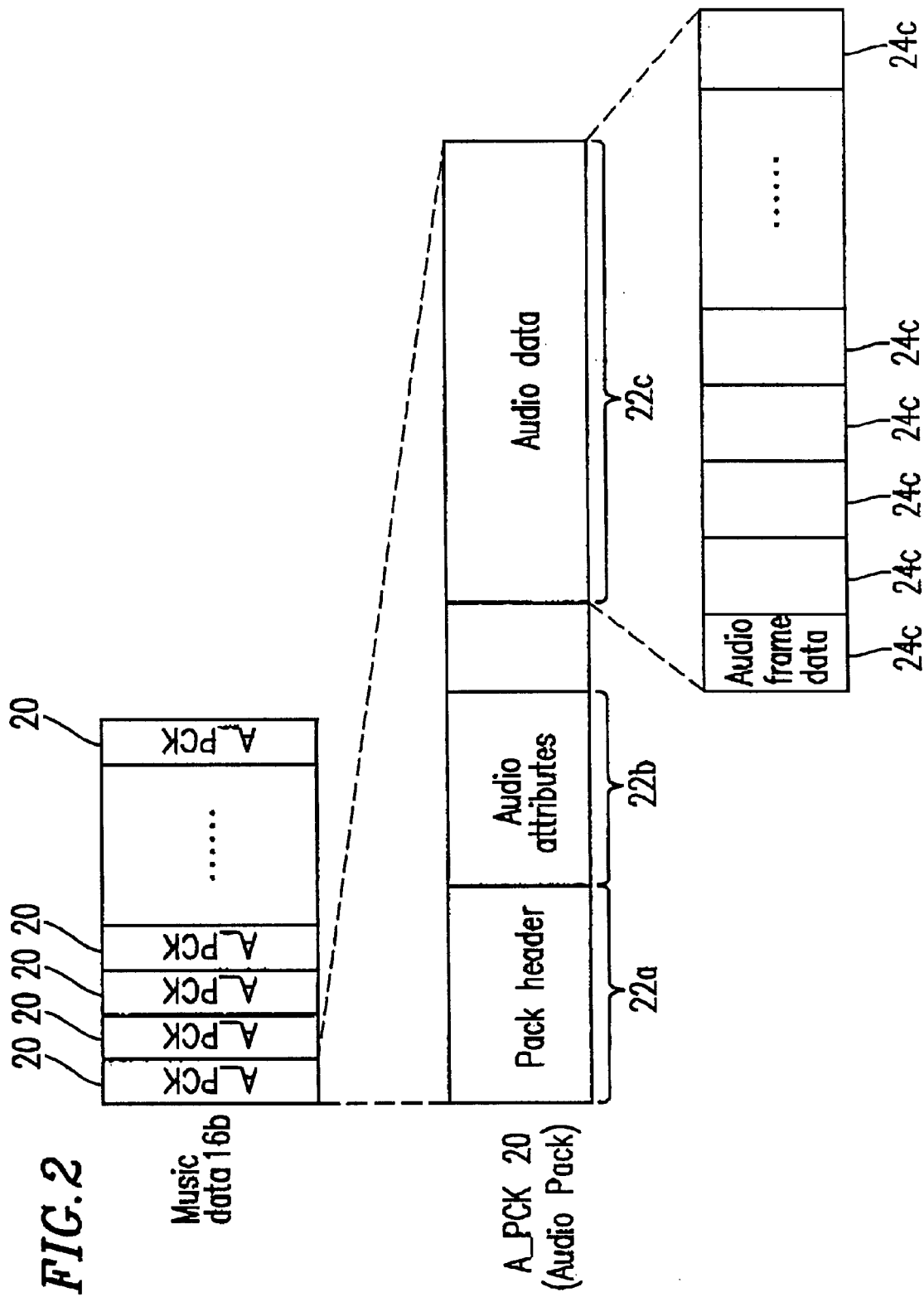
FIG. 2 is a diagram showing the data structure of music data 16b.

FIG. 2 shows the data structure of each unit of music data 16b. The music data 16b includes a plurality of audio packs (Audio Packs) 20 (shown as A_PCK in FIG. 2).

Each audio pack 20 includes a pack header 22a, audio attributes 22b, and audio data 22c.

The pack header 22a includes information indicating the lapse of time from the beginning of the music to that particular audiopack 20, address information for each audio frame (described below), and the like.

The audio attributes 22b include information indicating the attributes of the audio data 22c (e.g., the compression format, sampling frequency, and sampling bit rate). For example, the compression format may be non-compressed (linear PCM); the sampling frequency may be 44.1 kHz and the sampling bit rate may be 16 bits.

The audio data 22c is divided into a plurality of audio frames which contain audio frame data 24c. Thus, the audio data 22a includes a plurality of units of audio frame data 24c. Each unit of audio frame data 24c (which defines the minimum unit of audio data to be processed as data), includes a plurality of sampled data.

Copying control information 30 is previously recorded on the ROM disk 102. The copying control information 30 is multiplexed within the information which is recorded on the ROM disk 102 (e.g., the audio data 22c). The copying control information 30 is information which represents conditions for permitting or not permitting copying of the information recorded on the ROM disk 102 (e.g., audio data 22c), as described in detail below.

The copying control information 30 is formed in such a manner as to selectively indicate one of at least three conditions: "copying is permitted over an unlimited number of generations"; "only copying to a second generation copy is permitted"; or "copying is entirely prohibited". The copying control information 30 can be represented based on a combination of, for example, two kinds of water marks. The two kinds of water marks may belong to two different water mark formats, or belong to the same water mark format, but have two different parameters within the bounds of that format. The water marks can be multiplexed to the audio data 22c without substantially influencing the audio data 22c.

Table 1 shows an example of the copying control information 30 which is represented based on a combination of a first water mark (hereinafter "first WM") and a second water mark (hereinafter "second WM").

TABLE 1

| First WM | Second WM | Condition represented by copying control information 30 |
|---|---|---|
| absent | absent | Copying is permitted over an unlimited number of generations |
| present | absent | Only copying to a second generation copy is permitted |
| absent | present | — (impossible combination) |
| present | present | Copying is entirely prohibited |

As shown in Table 1, the copying control information 30 represented by the absence of both of the first WM and the second WM indicates the condition that "copying is permitted over an unlimited number of generations". The copying control information 30 represented by the presence of the first WM and the absence of the second WM together indicate the condition that "only copying to a second generation copy is permitted". The copying control information 30 represented by the presence of both of the first WM and the second WM indicates the condition that "copying, is entirely prohibited" being represented by the copying control information 30. It is assumed that the absence of the first WM and the presence of the second WM cannot occur concurrently (i.e., the second WM is only embedded if the first WM is present).

The first WM can be formed by embedding information representing a predetermined sequence of "0" and/or "1" (e.g., an alternating sequence of "0" and "1") in the respective units of audio frame data 24c contained in the music data 16b, by employing the conditions: frequency=$f_1$ and threshold=$T_{H1}$. For example, the information representing "0" can be expressed as an amplitude value of the audio frame data 24c not exceeding the threshold $T_{H1}$ at the frequency $f_1$. On the other hand, for example, the information representing "1" can be expressed as an amplitude value of the audio frame data 24c which exceeds the threshold $T_{H1}$, at the frequency $f_1$. The embedding of the information representing "0" or "1" associated with the first WM may be performed by using a special apparatus at the time of manufacturing the ROM disk 102.

The second WM can be formed by embedding information representing a predetermined sequence of "0" and/or "1" (e.g., an alternating sequence of "0" and "1") in each one of the units of audio frame data 24c contained in the music data 16b, by employing the conditions: frequency=$f_2$ and threshold=$T_{H2}$. The information representing "0" or "1" in a given unit of audio frame data 24c can be expressed in the same way as that described for the first WM. The embedding of the information representing "0" or "1" associated with the second WM is performed by a copying control information modification section 208 (described later with reference to FIG. 4) at the time of copying the information recorded on the ROM disk 102.

The reason for employing the first and second WMs to represent the copying control information 30 is to facilitate the modification of the condition "only copying to a second generation copy is permitted" into the condition "copying is entirely prohibited". Specifically, where the first WM is detected to be already present, the copying control information 30 is modified by additionally recording the second WM. For comparison, if the copying control information 30 could only be expressed on the basis of the first WM, the content of the first WM itself would have to be rewritten; however, it would be extremely difficult to rewrite any information which has already been embedded as the first WM in the audio frame data 24c.

Figure 3:
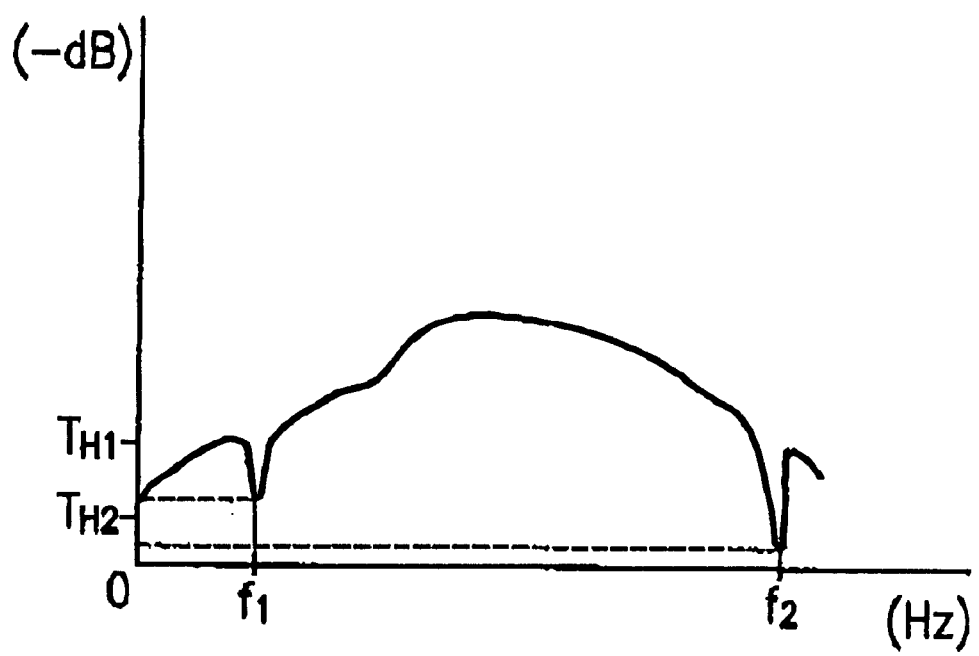
FIG. 3 is a diagram illustrating frequency components of exemplary audio frame data 24c.

FIG. 3 illustrates frequency components of exemplary audio frame data 24c. In the example shown in FIG. 3, information indicating "0" is embedded at respective points in the frequency spectrum of the audio frame data 24c corresponding to a frequency, $f_1$ and a frequency $f_2$. For example, the frequency $f_1$=about 100 Hz; the threshold $T_{H1}$=about −20 dB; the frequency $f_2$=about 200 Hz; and the threshold $T_{H2}$=about −10 dB. Each of the frequencies $f_1$ and $f_2$ are preferably within a frequency range which does not substantially affect the reproduction of the audio frame data 24c (e.g., a frequency range lying outside the audible frequency range to humans). Preferably, the frequencies $f_1$ and $f_2$ are set distant from each other in order to avoid misdetection. The threshold values $T_{H1}$ and $T_{H2}$ may be the same.

The values of the frequencies $f_1$ and $f_2$ are not to be disclosed to the public in order to make it extremely difficult for a third party to know or obtain the first WM and the second WM in an unauthorized manner. Since the first WM and the second WM are embedded in the waveform of the audio frame data 24c itself, the first WM and the second WM cannot be removed by any sort of process without greatly deteriorating the quality of the audio frame data 24c.

The first WM and the second WM do not need to be formed in all of the audio frame data 24c included in the music data 16b. Rather, the first WM and the second WM only need to be formed in a predetermined number of units of audio frame data 24c included in the music data 16b. For example, the first WM and the second WM may be formed in the audio frame data 24c included in the first to the $1000^{th}$ audio frames in the music data 16b. As a result, the processing load required for detecting the first WM and the second WM and additionally recording the second WM can be minimized, whereby the time required for such processing can be reduced.

Furthermore, the aforementioned method for forming the first WM and the second WM is only illustrative and in no way restrictive of the scope of the invention. The present invention encompasses the use of copying control information which is represented by a combination of any two kinds of watermarks, irrespective of the manner in which they are formed. It is also contemplated that the copying control information may be represented by a combination of three or more kinds of watermarks.

Although the copying control information 30 above is illustrated as being multiplexed to the audio data 22c, the copying control information 30 may alternatively be multiplexed to any type of data other than the audio data 22c.

FIG. 4 shows the structure of a copying system 1 according to one example of the present invention. The copying system 1 has the function of copying the information recorded on a ROM disk 102 onto a RAM disk 212. As used herein, a "ROM disk" is defined as a disk which only permits reading, whereas a "RAM disk" is defined as a disk which permits both reading and writing. Although the following description will be directed to copying from a ROM disk to a RAM disk, it will be appreciated that the principles of the present invention similarly apply to the copying from a RAM disk to a RAM disk.

The copying system 1 includes a ROM reading apparatus 100 for reading the information which is recorded on the ROM disk 102, and a RAM writing apparatus 200 for writing information onto the RAM disk 212. The ROM reading apparatus 100 and the RAM writing apparatus 200 are interconnected via a bus 400. A personal computer 300 is also connected to the bus 400. A copying command for instructing the copying of the information recorded on the ROM disk 102 to the RAM disk 212 is input via a keyboard 330 and/or a mouse 340 which are connected to the personal computer 300. The copying command which has been input may be displayed on a monitor display 320. The monitor display 320 is connected to an internal bus 310 via a video card 302. The internal elements of the personal computer 300 are controlled by a system control section 304.

The input copying command is output to the bus 400 via an interface (I/F) section 306, an internal bus 310, and a SCSI (Small Computer Systems Interface) controller 308. Thereafter, the copying command is transferred to a system control section 112 of the ROM reading apparatus 100 via a SCSI controller 116 of the ROM reading apparatus 100, and also transferred to a system control section 204 of the RAM writing apparatus 200 via a SCSI controller 262 of the RAM writing apparatus 200.

Upon receiving the copying command, the system control section 112 of the ROM reading apparatus 100 controls the respective elements of the ROM reading apparatus 100 so as to read the information which is recorded on the ROM disk 102. The ROM disk 102, which carries information recorded thereon, also carries the copying control information 30 for representing various conditions for permitting or prohibiting the copying of the information recorded on the ROM disk, 102. The copying control information 30 is recorded in a multiplexed format within the information recorded on the ROM disk 102. The method for recording the copying control Information 30 has been described above with reference to FIGS. 1 to 3.

A driving control section 108 of the ROM reading apparatus 100 controls the rotation of the ROM disk 102 by using a motor 104. A reading section 110 reads the information which is recorded on the ROM disk 102 by using a pickup 106.

A copying control information detection section 114 of the ROM reading apparatus 100 detects the copying control information 30 from within the information which has been read by the reading section 110. The copying control information detection section 114 outputs signals for indicating a detection result (i.e., a signal which indicates the presence/absence of the first WM and a signal which indicates the presence/absence of the second WM) to the system control section 112 of the ROM reading apparatus 100.

If the first WM is "absent" and the second WM is "absent", then the system control section 112 of the ROM reading apparatus 100 determines that the condition that "copying is permitted over an unlimited number of generations" is being represented by the copying control information 30. In this case, the system control section 112 outputs the information which has been read by the reading section 110 to the bus 400 via the SCSI controller 116.

If the first WM is "present" and the second WM is "absent", the system control section 112 of the ROM reading apparatus 100 determines that the condition that "only copying to a second generation copy is permitted" is being represented by the copying control information 30. In this case, the system control section 112 outputs the information which has been read by the reading section 119 to the bus 400 via the SCSI controller 116.

If the first WM is "present" and the second WM is "present", the system control section 112 of the ROM reading apparatus 100 determines that the condition that "copying is entirely prohibited" is being represented by the copying control information 30. In this case, the system control section 112 prohibits the information which has been read by the reading section 110 from being output to the bus 400 via the SCSI controller 116.

Thus, in the case where the copying of the ROM disk 102 is prohibited, the information which has been read from the ROM disk 102 is never output to the bus 400. As a result, the copyright to information recorded on the ROM disk 102 can be effectively protected.

The information which has been output to the bus 400 from the ROM reading apparatus 100 is input to a copying control information detection section 206 of the RAM writing apparatus 200 via a SCSI controller 202 of the RAM writing apparatus 200.

The copying control information detection section 206 of the RAM writing apparatus 200 detects the copying control information 30 from within the information which has been received from the ROM reading apparatus 100 via the bus 400. The copying control information detection section 206 outputs signals for indicating a detection result (i.e., a signal which indicates the presence/absence of the first WM and a signal which indicates the presence/absence of the second WM) to the system control section 204 of the RAM writing apparatus 200.

If the first WM is "absent" and the second WM is "absent" the system control section 204 of the RAM writing apparatus 200 determines that the condition that "copying ti permitted over an unlimited number of generations" is being represented by the copying control information 30. In this case, the system control section 204 supplies the, information which has been received via the bus 400 to a writing section 210 without modifying the copying control information 30. This may be achieved by, for example, allowing the information which has been received via the bus 400 to pass through the copying control information modification section 208 and enter the writing section 210.

If the first WM is "present" and the second WM is "absent", the system control section 204 of the RAM writing apparatus 200 determines that the condition that "only copying to a second generation copy is permitted" is being represented by the copying control information 30. In this case, the system control section 204 issues an instruction to the copying control information modification section 208 for prohibiting any further copying. Accordingly, the copying control information modification section 208 modifies the copying control information 30 so as to prohibit further copying, and the information containing the modified copying control information 30 is supplied to the writing section 210.

If the first WM is "present" and the second WM is "present", the system control section 204 of the RAM writing apparatus 200 determines that the condition that "copying is entirely prohibited" is being represented by the copying control information 30. In this case, the system control section 204 prohibits the information which has been received via the bus 400 from being supplied to the writing section 210. Note that this state never occurs when the RAM writing apparatus 200 is used in conjunction with an authorized or intended ROM reading apparatus, i.e., the ROM reading apparatus 100 having the above described structure, because, as described above, when the first WM is "present" and the second WM is "present", the system control section 112 of the ROM reading apparatus 100 prohibits the information from being output to the bus 400. Therefore, if this state does occur, a predetermined error handling process or warning process may be executed to indicate that the information has been received from an unauthorized source (i.e., an apparatus other than the ROM reading apparatus 100).

As described above, if it is determined that the copying control information 30 represents the condition that "only copying to a second generation copy is permitted", the copying control information 30 is modified so as to prohibit further copying. Accordingly, the copying of the ROM disk 102 to the RAM disk 212 is permitted only once, and copying of that RAM disk 212 to any other RAM disk is prohibited. As a result the contents on the ROM disk 102 are prevented from being copied by an unlimited number of times.

The writing section 210 of the RAM writing apparatus 200 writes the information which has been supplied thereto onto the RAM disk 212 via a pickup 234. A driving control section 218 of the RAM writing apparatus 200 controls the rotation of the RAM disk 212 in conjunction with a motor 216.

FIG. 5 is a flowchart showing a flow of processes of detecting the presence/absence of the first WM, which are performed by the copying control information detection section 114.

At step S510, one unit of audio frame data 24c included in the music data 16b is subjected to digital to analog conversion (D/A conversion).

At step S520, it is determined whether or not the analog signal obtained from the D/A conversion has an amplitude value exceeding the threshold value $T_{H1}$ at the frequency $f_1$. A band-pass filter may be used for detecting the amplitude value of an analog signal at a given frequency. Alternatively, a combination of a low-pass filter and a high-pass filter may be employed for detecting the amplitude value of an analog signal at a given frequency. If the result of the determination by step S520 is "Yes", it means that information representing "1" has been detected. If the result of the determination by step S520 is "No", it means that information representing "0" has been detected.

At step S530, it is determined whether or not the detected "0" or "1" coincides with each one of a series of expected values for the first WM. For example, the expected values for the first WM may be a sequence of "0" and "1" alternating for every audio frame data 24c. If the detected "0" or "1" coincides with each expected value, the process proceeds to step S540 for determination of completion of the process, and if completion of the process is not determined, then the processes of steps S510 to S530 are repeated until the last audio frame data 24c is reached. If the detected "0" or "1" does not coincide with an expected value, the process proceeds to step S560.

Thus, if every "0" and "1" detected in the first to last audio frame data 24c of the music data 16b coincides with an expected value, then WM1=1 is determined (step S550); otherwise, WM1=0 is determined (step S560). Note that a random sequence of "0" and "1" will be detected if the first WM is not embedded in the music data 16b, and such a random sequence does not coincide with the predetermined sequence of expected values (e.g., an alternating sequence of "0" and "1").

In the case where the first WM is formed, if at all, in only the first to $1000^{th}$ units of audio frame data 24c of the music data 16b, step S540 may make the determination of "Is it the $1000^{th}$ unit of audio frame data 24c?" instead of the determination of the completion of the process.

The process for detecting the presence/absence of the second WM may be the same as that for the first WM except that it is determined whether or not the analog signal obtained from the D/A conversion has an amplitude value exceeding the threshold value $TH_2$ at the frequency $f_2$ at step S520. The detection of the presence/absence of the second WM is also performed by the copying control information detection section 114. If every "0" and "1" detected in the first to last audio frame data 24c of the music data 16b coincides with an expected value, then WM2=1 is determined. Otherwise, WM2=0 is determined.

The signal WM1 is a signal which indicates the presence/absence of the first WM. If WM1=1, the first WM is "present"; if WM1=0, the first WM is "absent". Similarly, the signal WM2 is a signal which indicates the presence/absence of the second WM. If WM2=1, the first WM is "present"; if WM2=0, the second WM is "absent". The signals WM1 and WM2 are output to the system control section 112 of the ROM reading apparatus 100.

The copying control information detection section 206 also performs a process for detecting the presence/absence of the first WM and the second WM. The resultant signals WM1 and WM2, indicating the presence/absence of the first WM and the second WM, respectively, are output to the system control section 204 of the RAM writing apparatus 200.

FIG. 6 is a flowchart showing a flow of processes of modifying the copying control information 30, which are performed by the copying control information modification section 200.

At step S610, one unit of audio frame data 24c included in the music data 16b is subjected to digital to analog conversion.

At step S620, waveform synthesis is performed so that information representing "0" or "1" is written at the frequency $f_2$ of the analog signals obtained from the D/A conversion. For example, the values of the information obtained from the waveform synthesis may be a sequence of "0" and "1" alternating for every audio frame data 24c.

At step S630, the analog signal unit of audio frame data 24c obtained from the waveform synthesis is subjected to analog to digital conversion (A/D conversion).

Steps S610 to S630 are repeated for the first to last audio frame data 24c of the music data 16b.

In the case where the second WM is formed, if at all, in only the first to $1000^{th}$ units of audio frame data 24c of the music data 16b, step S640 may make the determination of "Is it the $1000^{th}$ unit of audio frame data 24c?" instead of the determination of the completion of the process.

Thus, the second WM is written or embedded in the music data 16b, representing the new condition that "copying is entirely prohibited" as opposed to the previous condition that "only copying to a second generation copy is permitted".

The processes shown in FIGS. 5 and 6 can be carried out by a program, which is executable by a CPU, for example. Alternatively, the processes may be carried out in a hardware implementation employing wired logic having functions similar to a CPU-executable program.

The information recorded on the ROM disk 102 illustrated in the aforementioned example may be encrypted information. The information recorded on the ROM disk 102 may be encrypted by any desired encryption method. In this case, a decryption section for decrypting the encrypted information may be provided between the reading section 110 and the copying control information detection section 114 in the ROM reading apparatus 100 (FIG. 4). A decryption key for decrypting encrypted data can be recorded on, for example, the ROM disk 102. The decryption key may be read by a decryption key reading section so as to be supplied to the decoding section.

The information recorded on the RAM disk 212 illustrated in the aforementioned, example, may be encrypted information. The information recorded on the RAM disk 212 may be encrypted by any desired encryption method. In this case, an encryption section for encrypting information may be provided between the copying control information modification section 208 and the writing section 210 in the RAM writing apparatus 200 (FIG. 4). The information identifying an encryption method (e.g., ID information which is specific to each RAM disk 212) can be recorded on, for example, the RAM disk 212. The information identifying the encryption method may be read by an encryption method reading section so as to be supplied to the encryption section.

According to the present invention, there is provided a copying system for copying the information which is recorded on a first recording medium onto a second recording medium. Copying control information is also recorded on the first recording medium information so as to be multiplexed within the information recorded thereon. If the copying control information is detected to represent a condition that "only copying to a second generation copy is permitted", then the copying control information is modified so as to prohibit further copying. Thus, the copying of the first recording medium to the second recording medium is permitted only once, and thereafter the copying of the second recording medium to any other recording medium is prohibited. As a result, the information recorded on the first recording medium is prevented from being copied by an unlimited number of times, thereby providing an enhanced protection for the copyright to the information recorded on the first recording medium.

The copying control information may be represented by a combination of two kinds of watermarks. This facilitates the modification of the copying control information because it is achieved simply by additionally writing one of the two watermarks.

The copying control information is preferably multiplexed to a predetermined number of frames among a plurality of frames. As a result, the processing load of detecting or modifying copying control information can be reduced, thereby shortening the overall processing time.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A copying system for copying audio data recorded on a first recording medium onto a second recording medium,
   wherein the first recording medium is recorded with copying control information for representing conditions for permitting copying of the audio data recorded on the first recording medium, the copying control information being multiplexed within a frequency band of the audio data recorded on the first recording medium the copying control information being represented by a combination of two kinds of first and second watermarks, present or absent,
   wherein the copying system comprises:
       a reading section for reading the audio data from the first recording medium:
       a detection section for detecting the copying control information within the audio data read from the first recording medium:
       a modification section for, if the copying control information represents a condition that "only copying to one generation is permitted", modifying the copying control information so as to prohibit any further copying by multiplexing in and newly adding the second watermark, which is not already multiplexed to the audio data, within a predetermined second frequency band different from a predetermined first frequency band of the audio data, without rewriting the first watermark, which is multiplexed within the predetermined first frequency band of the audio data: and
       a writing section for writing audio data including the modified copying control information, onto the second recording medium.

2. A copying system according to claim 1, wherein,
   if both of the first and second watermarks are not multiplexed to the audio data, the copying control information represents "copying is permitted over an unlimited number of generations":
   if the first watermark is multiplexed to the audio data while the second watermark is not multiplexed to the audio data, the copying control information represents "only copying to one generation is permitted": and
   if both of the first and second watermarks are already multiplexed to the audio data, the copying control information represents "copying is entirely prohibited".

3. A copying method for copying audio data recorded on a first recording medium onto a second recording medium,
   wherein the first recording medium is recorded with copying control information for representing conditions for permitting copying of the audio data recorded on the first recording medium, the copying control information being multiplexed within a frequency band of the audio data recorded on the first recording medium the copying control information being represented by a combination of two kinds of first and second watermarks, present or absent,
   wherein the copying method comprises the steps of:
       reading the audio data from the first recording medium:
       detecting the copying control information within the audio data read from the first recording medium:
       if the copying control information represents a condition that "only copying to one generation is permitted", modifying the copying control information so as to prohibit any further copying by multiplexing in and newly adding the second watermark, which is not already multiplexed to the audio data, within a predetermined second frequency band different from a predetermined first frequency band of the audio data, without rewriting the first watermark, which is multiplexed within the predetermined first frequency band of the audio data: and
       writing audio data including the modified copying control information, onto the second recording medium.

4. A copying method according to claim 3, wherein,
   if both of the first and second watermarks are not multiplexed to the audio data, the copying control information represents "copying is permitted over an unlimited number of generations";
   if the first watermark is multiplexed to the audio data while the second watermark is not multiplexed to the audio data, the copying control information represents "only copying to one generation is permitted": and
   if both of the first and second watermarks are already multiplexed to the audio data, the copying control information represents "copying is entirely prohibited".

5. A writing apparatus connected via a bus to a reading apparatus for reading audio data recorded on a first recording medium,
   wherein the first recording medium is recorded with copying control information for representing conditions for permitting copying of the audio data recorded on the first recording medium, the copying control information being multiplexed within a frequency band of the audio data recorded on the first recording medium the copying control information being represented by a combination of two kinds of first and second watermarks, present or absent,
   wherein the writing apparatus comprises:
       a reading section for reading the audio data from the first recording medium:
       a detection section for detecting the copying control information within the audio data read from the first recording medium:
       a modification section for, if the copying control information represents a condition that "only copying to one generation is permitted", modifying the copying control information so as to prohibit any further copying by multiplexing in and newly adding the second watermark, which is not already multiplexed to the audio data, within a predetermined second frequency band different from a predetermined first frequency band of the audio data, without rewriting the first watermark, which is multiplexed within the predetermined first frequency band of the audio data: and a writing section for writing audio data including the modified copying control information, onto the second recording medium.

6. A writing apparatus according to claim 5, wherein, if both of the first and second watermarks are not multiplexed to the audio data, the copying control information represents "copying is permitted over an unlimited number of generations":

if the first watermark is multiplexed to the audio data while the second watermark is not multiplexed to the audio data, the copying control information represents "only copying to one generation is permitted": and if both of the first and second watermarks are already multiplexed to the audio data, the copying control information represents "copying is entirely prohibited".

7. A recording medium recorded with audio data representing a content to be recorded, and copying control information representing a condition for permitting copying of the audio data recorded on the recording medium, wherein the copying control information is multiplexed within a frequency band of the audio data recorded on the recording medium, and the copying control information is represented by a combination of two kinds of first and second watermarks, present or absent.

8. A recording medium according to claim 7, wherein, if both of the first and second watermarks are not multiplexed to the audio data, the copying control information represents "copying is permitted over an unlimited number of generations":

if the first watermark is multiplexed to the audio data while the second watermark is not multiplexed to the audio data, the copying control information represents "only copying to one generation is permitted": and if both of the first and second watermarks are already multiplexed to the audio data, the copying control information represents "copying is entirely prohibited".

* * * * *